United States Patent [19]

Jarovitzky et al.

[11] Patent Number: 4,929,687

[45] Date of Patent: May 29, 1990

[54] POLYMERS AND PROCESS OF MAKING SAME

[75] Inventors: Peter A. Jarovitzky, Stamford; Yun-Lung Fu, Milford; Robin W. Dexter, Wilton, all of Conn.

[73] Assignee: American Cyanamid Company, Stamford, Conn.

[21] Appl. No.: 859,681

[22] Filed: May 5, 1986

[51] Int. Cl.$^5$ ................................................ C08F 8/22
[52] U.S. Cl. ................................ 525/328.2; 525/329.4; 525/356; 526/292.2; 526/292.95
[58] Field of Search .................... 525/328.2, 329.4; 526/292.2, 292.95

[56] References Cited

U.S. PATENT DOCUMENTS

| | | | |
|---|---|---|---|
| 2,533,166 | 1/1948 | Jones | 526/292.95 |
| 3,039,529 | 6/1962 | McKennon | 525/329.4 |
| 3,686,306 | 8/1972 | Hoke | 526/292.95 |
| 4,075,183 | 2/1978 | Kawakami et al. | 526/292.2 |
| 4,090,992 | 5/1978 | Scanley | 524/555 |
| 4,147,681 | 4/1979 | Lim et al. | 526/292.95 |
| 4,301,257 | 11/1981 | Zengel et al. | 525/329.4 |
| 4,356,289 | 10/1982 | Zengel et al. | 515/358 |
| 4,357,447 | 11/1982 | Zengel et al. | 526/292.95 |

FOREIGN PATENT DOCUMENTS 2338755 2/1975 Fed. Rep. of Germany .

*Primary Examiner*—Bernard Lipman
*Attorney, Agent, or Firm*—Frank M. Van Riet

[57] ABSTRACT

Novel N-chloroamide polymers and a process for the production thereof are disclosed.

8 Claims, No Drawings

POLYMERS AND PROCESS OF MAKING SAME

BACKGROUND OF THE INVENTION

The treatment of paper-making fibers to render paper made therefrom stronger when wet has a long history of development. Many different polymeric materials have been utilized for this purpose. Among such polymers are the amino-aliphatic polymers set forth in U.S. Pat. No. 2,729,560 wherein there is disclosed the hypochlorite treatment of acrylamide polymers whereby 20–80% of the amide groups thereof are converted to amino groups. U.S. Pat. No. 2,890,978, on the other hand, discloses a similar hypochlorite process wherein less than 15% of the amide groups are degraded to amino groups and whereby dry strength is imparted to paper when the polymer produced is applied thereto. Both of these patents teach the addition to fibers or finished paper of polymers which are the final degradation products of the Hoffmann reaction of acrylamide polymers with hypochlorite or chlorine under alkaline conditions.

Additionally, U.S. Pat. No. 3,929,744 discloses the reaction of a sterically hindered amide polymer with a hypochlorite to produce an isocyanate - functional polymer useful as a coating composition after cross-linking with a polyol or polyamine, while U.S. Pat. No. 4,301,257 teaches a similar polymer produced by reacting a low molecular weight chlorinated acrylamide polymer with a tertiary amine having a pKa value of over 7 in an inert solvent. Twenty to one hundred percent of the amide groups of the charge polymer are said to be converted to isocyanate groups. The maximum molecular weight of the polymer is said to be about 10,000.

Processes of making polyfunctional N-chloroamide derivatives of acrylamide homo and copolymers are taught by U.S. Pat. Nos. 4,356,289 and 4,357,447 wherein chlorine in a dilute aqueous suspension of a mineral acid at 0°–40° C. is employed. German Pat. No. 2,931,572 also teaches such a chlorination process. Again, very low molecular weight polymers are produced.

Belgium Pat. No. 878,978 is similar to U.S. Pat. No. 4,301,257, discussed above, wherein amide-containing acrylic polymers are chlorinated and rearranged to isocyanate groups in the presence of tertiary amines. The polymers are of very low molecular weight.

Japanese Pat. No. 57,158,203 (82,158,203) discloses the reaction of polyacrylamide with a hypochlorite salt (or Cl$_2$ and alkali) to provide isocyanate groups and then with a diamine to provide amino group-containing polymers useful for paper strengthening and is therefore also similar to U.S. Pat. No. 4,301,257.

Hahn et al. Angew, Makromol, Chem., 50, (1), 53–65, (1976) teaches the chlorination of polyacrylamides with HoCl, Me$_3$COCl and Cl$_2$O to provide chlorinated secondary amides wherein the recurring unit in the polymer is

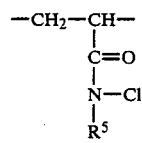

R$^5$ being alkyl or aryl.

Water-in-oil polyacrylamide emulsions are chlorinated in U.S. Pat. No. 4,090,992 whereby said emulsions, containing less than 40% of water, are contacted with chlorine gas at −20° C.

The present invention differs from the teachings of U.S. Pat. Nos. 2,729,560, and 2,890,978 disclosed above in that the compositions which are prepared by the present novel process and applied to paper are N-chloro substituted acrylamide polymers whereas the products of the '560 and '978 patents are amino-containing products. The prior art products contain amide, amino and carboxylate groups, but no N-chloro groups. The present invention further resides in the addition of the N-chloro group containing polymers to paper pulp or paper sheet followed by a reaction or series of reactions which cross-link the polymer and thus link the polymer to the paper fibers via the N-chloro functional groups. Furthermore, wet strength is developed in paper using products of the present invention containing as little as 1% N-chloroamide groups whereas '560 teaches that at least 20% of the amide groups must be converted to amino groups before wet strength is achieved in paper.

The teachings of U.S. Pat. No. 3,929,744 also are distinguishable from the instant invention in that the '744 patent focuses on the production of isocyanate group containing polymers. The polymers are not disclosed as paper additives, but coating compositions. Although isolatable, the chlorinated products are very unstable and water-insoluble.

U.S. Pat. No. 4,301,257, and, by similarity, Belgian Pat. No. 878,978 and Japanese Pat. No. 57,158,203, also teach the production of isocyanate group containing polymers as coatings. The products are void of any N-chloro groups and are not taught as functional for combining with cellulosic fibers for imparting wet strength to paper. The products produced by these prior art processes are water-insoluble and solvent soluble whereas the products of the present invention are water-soluble and solvent insoluble.

The Hahn, et al products are secondard amides and, as such, are not anticipatory of the instant products or disclosed as useful in paper-making.

The above-disclosed patents directed to the reaction of chlorine gas with acrylamide polymers using dilute aqueous suspensions in mineral acid, i.e., U.S. Pat. Nos. 4,356,289, 4,357,447 and German Pat. No. 2,931,572 are closely related to the invention disclosed herein but are distinguishable therefrom in many ways.

Primarily, the products of the prior art are almost insoluble in water, but have good solubility in organic solvents whereas, as mentioned above, our products are totally soluble in water and totally insoluble in almost all organic solvents. Secondarily, the products of the prior art are limited to a molecular weight of 10,000 whereas our products may have molecular weights as high as 1,000,000, or more.

U.S. Pat. No. 4,090,992 is the closest prior art known to the instant inventors which deals with the treatment of polymer emulsions with chlorine gas. This patent, however, labors under the misconception that the water content of the water-in-oil emulsion must be less than 40%, by weight, based on the amount of polymer and water in the emulsion. The patentee postulates that it is first necessary to remove any excess water from the emulsion before the contact with chlorine gas can be effective because if such is not accomplished, coagulation or agglomeration of the polymer results and the stability of the system fails. Furthermore, the prior art emulsion is dried by vacuum evaporation and requires a "breaker" surfactant added to the water used before a solution of the polymer will form. The patentee then adds chlorine to the dried emulsion, see Example 10, over 1 hour to give a total of 0.04 mole of chlorine which calculates to 9.5 moles of chlorine per 100 moles of polymer. At this stage, the procedure of the patent results in little, if any, reaction of the chlorine with the polymer. In reality, a solution of the chlorine in the oil of the emulsion results, which chlorine is released on subsequent warming. Following the chlorine addition, the patent discloses adding caustic soda. Sodium hypochlorite is thereby formed and reacts at high temperature according to the Hoffman reaction and the subsequent formation of an amino group containing polymer. The crux of the patent is that if the emulsion is not dehydrated, the chlorine gas, the sodium hydroxide emulsion and the breaker surfactant cannot be added. Not once in his disclosure does the patentee indicate that the charge polymer has been chlorinated.

It has now been found that chlorination of the acrylamide polymer can be accomplished without prior dehydration and is, in fact, more rapid than under dry conditions. The presence of water may be a necessary adjunct to the chlorination reaction.

SUMMARY OF THE INVENTION

A novel class of N-chloroamide containing polymers has been found as well as a process for its production. The polymers are water-soluble, of high molecular weight and do not break-down when present in emulsion form. They provide excellent wet-strength agent to paper when combined with cellulosic fibers and formed into paper and as such, the paper so-treated and the method for its production also comprise part of the inventive concept hereof. As used herein, the terms "N-chloro" or N-chloroamide" should also be read to comprise other halogen groups such as N-bromo, N-iodo, N-fluoro, etc., groups.

DESCRIPTION OF THE INVENTION INCLUDING PREFERRED EMBODIMENTS

As mentioned above, this invention relates to the combination of various N-chloroamide containing polymers with cellulosic fibers and the fibrous materials prepared therefrom, and is directed particularly to a method for imparting wet strength to felted fibrous cellulosic materials such as paper, board, shaped pulp articles and the like. The invention also includes, as an additional important feature, the production of permanently strengthened paper, board and the like which retain their strength under wet alkaline conditions. The invention includes the improved cellulosic fibers and fibrous products themselves, as well as methods of preparing these products, the N-chloroamide containing polymers which provide such wet strength and the method for their production as will hereinafter be more fully described.

It is a principal object of the present invention to provide paper, board and other fibrous products by combining cellulosic fibers with a novel class of N-chloroamide polymers which impart wet tensile strength thereto. The invention consists inpart in the application of these polymers to water suspensions of hydrated or unhydrated cellulosic paper-making fiber pulp in the beater, stock chest, head box or at any other suitable point ahead of the paper-forming step or the application of the polymers to the fibers of preformed paper as an aqueous spray or as a tub size, either alone or in admixture with other impregnating agents.

The term "paper", as used herein, is meant to include any cellulosic fiber containing mat or web which is prepared by drawing down a dilute aqueous cellulose fiber suspension which may contain other fibrous matter such as glass fiber, polyamide fiber, viscose fiber and the like. Examples include fabrics, felts, boards, shaped articles, etc.

We have found that the above and other objects are accomplished by applying to fibrous, cellulosic material such as paper pulp, or the fibers of preformed paper, a type of polymeric material which is hereinafter described as N-chloroamide polymers. We have found that polymers of this class are substantive to fibers of cellulosic material such as paper pulp in aqueous suspension; i.e., the polymer is selectively adsorbed or absorbed by the cellulosic fibers from a dilute aqueous solution or dispersion thereof containing these fibers in amounts much greater than those corresponding to the concentration of polymer in the solution or to what would be contained in the water normally left in the sheet after forming. This permits the application to cellulosic fibers of sufficient quantities of the wet strength-imparting polymer to produce the desired degree of wet strength while the fibers are in dilute aqueous suspensions of the consistency ordinarily used in paper mills, which is about 0.1–6% or, in special processes, at higher consistencies.

The N-chloroamide chain polymers used in practicing our invention are prepared, according to the invention, from linear aliphatic chain polymers wherein carboxylic acid amide groups are attached to carbon atoms of the polymer-forming chain. A number of polymers and copolymers of this type are well known, and may be used as raw materials. However, the preferred materials are polymers of acrylamide, polymers of lower alkyl-substituted acrylamides such as polymethacrylamide and polyethylacrylamide and copolymers of these acrylamides with other polymerizable monomers which result in the production of water-soluble polymers.

The above-described starting materials are known to exist in the form of both lower molecular weight polymers and relatively high molecular weight polymers, and either form may be used in practicing the present invention. It is known, for example, that polyacrylamides of controlled molecular weights can be obtained by polymerizing acrylamide in water containing approximately 5 to 40% by volume of a water-miscible alcohol such as ethanol or isopropanol; by this procedure polymers having molecular weights as low as 2,000 or as high as 300,000 can be prepared. Similar procedures may be used in preparing the copolymers described above, and the resulting molecular weights of the products are comparable; i.e., they range from about 2,000 to about 40,000 in the low polymers and from 50,000 to 500,000 or more in the higher polymers. It is also known that polyacrylamides or the copolymers described above having molecular weights as high as 10,000,000 can be prepared by procedures known as inverse emulsion polymerization. As will subsequently be illustrated, polymers and copolymers of either class may be used with the formation of the corresponding N-chloroamide chain polymers useful for imparting wet-strength to paper by combining them with cellulosic fibers.

The N-haloamide polymers are produced by converting part of the carboxylic acid amide groups of linear carbon chain polymers of the above types into N-chloroamide groups by the action of e.g., chlorine in an aqueous solution, inverse emulsion, dispersion, or two-phase reaction medium. This conversion of amide groups into N-haloamide groups is known and it has long been applied to substantially non-polymerized compounds. By employing the reaction conditions hereinafter described, a proportion of the amide groups of polyacrylamides and acrylamide copolymers are converted into N-haloamide groups with the formation of the desired resinous products.

The novel N-haloamide polymers of the present invention have molecular weights, based upon their intrinsic viscosity, of at least about 100,000, however, the polymers useful for combining with cellulosic fibers and forming into paper may have molecular weights as low as about 2,000 preferably 10,000.

The novel products of the present invention are polymers or co-polymers which contain N-haloamide groups. These reaction products of polyacrylamides correspond substantially to the formula:

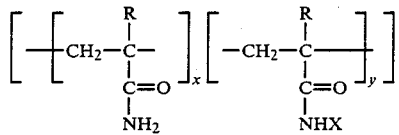
(I)

in which R is hydrogen or methyl, the ratio of x to y is from about 99.9:0.1 to about 50:50, respectively, preferably about 98:2.0 to 85:15, same basis, X is a halogen and the molecular weight is at least 100,000.

The novel reaction products of cationic acrylamide co-polymers correspond substantially to the formula:

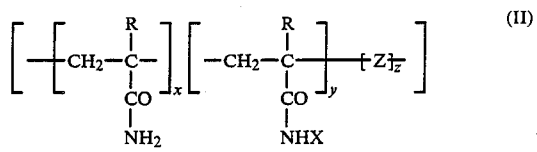
(II)

in which R, X and the ratio of x to y are as defined above, the ratio of (x plus y) to z ranges from about 99.9:0.1 to about 50:50, respectively, preferably about 95:5 to about 85:15, Z constitutes the polymerization residue of a cationic monomer copolymerizable with an acrylamide, and the molecular weight is at least about 100,000.

Alternatively, component x of Formulae I or II may be replaced by a non-ionic monomer as long as the resultant polymer is water-soluble. This is to say, component x of Formulae I or II may be substituted by a non-ionic monomer such as those enumerated below e.g., N-vinyl pyrolidone. Preferably, from about 1–20%, by weight, of the component x may be replaced by the non-ionic monomer, i.e., the polymer contains from 0 to about 20%, by weight, of component x replaced by a non-ionic monomer. Such polymers are produced by charging a starting copolymer of the nonic monomer and an acrylamide (or including a monomer z) to the process described below.

The following table illustrates some examples of useful cationic monomers and the corresponding structure of Z.

| Cationic Monomer | ─Z─ |
|---|---|
| H₂C=CH  CH=CH₂<br>  \|      \|<br> H₂C    CH₂<br>    \⊕/<br>     N<br>   /  \<br> H₃C    CH₃  Cl⊖ (DADM) | ─[CH₂─CH──CH─CH₂]─<br>       \|      \|         Cl⊖<br>      H₂C    CH₂<br>        \⊕/<br>         N<br>       /   \<br>     H₃C    CH₃ |
| CH₃<br>  \|<br>CH₂=C<br>  \|<br>  C=O<br>  \|<br>  NH    (MAPTAC)<br>  \|<br> (CH₂)₃<br>  \|⊕<br>H₃C─N─CH₃  Cl⊖<br>  \|<br>  CH₃ | CH₃<br>  \|<br>─[CH₂─C────]─<br>       \|<br>       C=O<br>       \|<br>       NH<br>       \|<br>      (CH₂)₃<br>       \|⊕<br>     H₃C─N─CH₃  Cl⊖<br>       \|<br>       CH₃ |

| Cationic Monomer | | $+Z+$ |
|---|---|---|
| $CH_2=C(CH_3)-C(=O)-O-CH_2-CH_2-N^{\oplus}(CH_3)_3$   $CH_3OSO_3^{\ominus}$ | Q—DMAEM Methosulphate | $[-CH_2-C(CH_3)(-C(=O)-O-CH_2-CH_2-N^{\oplus}(CH_3)_3)-]$   $CH_3OSO_3^{\ominus}$ |
| $CH_2=C(R)-C(=O)-O-CH_2-CH_2-N^{\oplus}(CH_3)_3$   $Cl^{\ominus}$ | (R = H: Q—DMAEA Methylchloride) (R = $CH_3$: Q—DMAEM Methyl chloride) | $[-CH_2-C(R)(-C(=O)-O-CH_2-CH_2-N^{\oplus}(CH_3)_3)-]$   $Cl^{\ominus}$ |

Z may also be introduced into the products by the modification of the polymers before or after the chlorination so that it makes the products cationic. (For example, a cationic polymer may be prepared by the Mannich reaction on a polyacrylamide, and then the Mannich polyacrylamide may be chlorinated to produce the cationic N-chloroamide polymer. In this case

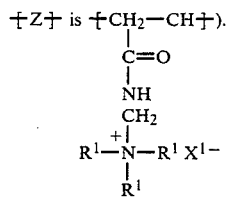

$+Z+$ is $+CH_2-CH+$).

$R^1$ may be $CH_3$, $C_2H_5$, etc.
$X^1$ may be $CH_3OSO_3^-$, etc.

Other cationic monomers known to those skilled in the art may also be used, i.e., any such monomer copolymerizable with an acrylamide.

In the production of the N-haloamide polymers of this invention, any polymer, including neutral, cationic, natural or synthetic polymers which contain carboxylic acid amide groups, preferably, linear aliphatic chain polymers and copolymers wherein carboxylic acid amide groups are attached to carbon atoms of the polymer-forming chain are reacted with any halogen (preferably chlorine) at a temperature ranging from about $-10°$ C. to 80° C., preferably 0° C. to 40° C. In carrying out the reaction, the polymer or copolymer is introduced in the reaction vessel in the form of a solution in water, or an emulsion of a polymer solution dispersed in an oil. The polymer or copolymer can also be dispersed in a two phase solvent system which contains an organic phase and an aqueous phase. The organic phase may be composed of hydrocarbon solvents such as heptanes and/or chlorinated hydrocarbon solvents such as methylene chloride. The polymer or copolymer may be soluble in the two phase system or may be dispersed in solid form. When a water-in-oil emulsion of the charge polymer is used, it should contain more than 40%, by weight, based on the total weight of said polymer and water, of water.

Before the addition of halogen, it is preferable to make sure that the reaction mixture is neutral or slightly acidic. When the reaction mixture is alkaline, the pH level of the reaction mixture should be adjusted to about pH 7 or slightly below. This can be accomplished by adding a buffer solution or an aqueous mineral acid. Suitable aqueous mineral acids are e.g., dilute, aqueous hydrochloric acid, sulfuric acid, phosphoric acid etc. It is preferable to use dilute hydrochloric acid or sulfuric acid. The desired amount of halogen is then introduced into the reaction mixture. Halogenation proceeds exothermally and the reaction is preferably carried out for a period of from about 5 minutes to about 4 hours, preferably with stirring, while maintaining the reaction temperature within the above range. The reaction can be carried out either in the presence of light or in the dark. The use of temperatures higher than about 40° C. or the use of reaction time more than about 1 hour are not particularly desired because quantities of carboxyl groups may be formed by hydrolysis. The amount of halogen that is present is carefully controlled to yield the desired products. The amount of the halogen that is added to the reaction mixture is calculated by the number of recurring mer-moles of carboxylic acid amide groups present in said polymer or copolymer. The mol ratio of halogen, as above calculated, and the said polymer or copolymer will be present in an amount varying from about 0.1:99.9 to about 50:100, respectively. It is preferred, however, that the molar ratio be within the range of from about 1:99 to about 20:100, respectively. Halogenation is carried out at ambient or at elevated pressures. The required reaction time decreases with increasing pressure, but, for reasons for economy, the preferred pressure should range from about 1 to about 6 atmospheres gauge pressure. During the halogenation process, care is preferably taken that the reaction mixture be properly mixed. The reaction mixture is diluted, at least to such an extent, that it can be stirred, or mixed by some other means, without any difficulty. When the above preceding conditions are maintained, halogenation is completed in about 5 minutes to 4 hours, preferably about 10 minutes to 2 hours. Depending on the amount of halogen used in the reaction, the composition of polymers or copolymers and the reaction conditions, the carboxylic acid amide groups can be transformed into N-haloamide groups varying in the range from about 1% to about 100%, preferably about 5-20%. The content of N-halo amide group can be determined by an "active halogen titration" method. Dehydration of the resultant water-in-oil emulsion of chlorinated polymer to below about 20% by weight, preferably 10%, is preferred to stabilize the system against degradation.

The process of isolating the product depends on several factors. These factors include the composition of the polymers or copolymers, the range of the conversion of carboxylic acid amide groups to N-haloamide groups, and the physical form of the reaction mixture, i.e., aqueous solution, emulsion of polymer solution in an oil, two phase solution, solid dispersion of the polymer or copolymer in water, two phase reaction medium or the like. In general, when the conversion of the carboxylic acid amide groups to N-haloamide is high, e.g., above about 50%, the reaction product precipitates from reaction solution during or after the completion of the halogenation reaction. The product can thus be separated from the reaction mixture by conventional means, for example, by filtering or centrifuging. The more highly chlorinated polymers are soluble in DMSO. In case the product is soluble in the reaction mixture after the completion of halogenation, the product can be separated from the reaction mixture by the conventionally known technique of precipitation, that is, by the addition of a water-soluble organic solvent such as, for example, methanol, ethanol, propanol, etc. to the reaction mixture, or by precipitating the product by pouring the reaction mixture into a water-soluble organic solvent, as mentioned above. The amount of the water-soluble organic solvent used for the precipitation generally ranges from an amount about equal to or ten times the volume of the reaction mixture. Although the product can be separated from the reaction mixture by the various means described above, it is not always necessary to separate the product from the reaction mixture, i.e., the reaction mixture can be used directly as produced.

As discussed briefly above, the N-chloroamide polymers, prepared as described above, can be applied to paper products by tub application methods if desired. Thus, for example, preformed and completely or partially dried paper prepared from a chemical pulp such as sulfite pulp, sulfate pulp or a mechanical pulp such as groundwood or any mixture thereof may be immersed in or sprayed with a 1% to 5% aqueous solution or dispersion of the polymer and impregnated with about 50-100% thereof, based on the weight of the paper. The paper may then be heated for about 0.1 to 60 minutes at temperatures of 75°-300° F., or for shorter times at higher temperatures, whereby the paper is dried and polymer-bonding of the fibrils thereof is developed. The resulting paper has increased wet strength, and therefore this method is well suited for the impregnation of paper towels, absorbent tissue and the like as well as heavier stock such as kraft wrapping paper, bag paper board grades and the like.

However, because of the substantive properties of the N-haloamide polymers for cellulosic fibers, i.e., they are water-soluble or water-dispersible in the form of colloidal solutions under the conditions normally used in preparing paper furnishes, including those containing calcium carbonate or other alkaline sizing materials, they deposit selectively by adsorption or absorption on the fibers of cellulosic paper stock. Accordingly, the polymers may be dissolved in an aqueous suspension of the paper stock, or may be predissolved and added thereto as an aqueous solution, and this addition may be made in the beater, stock chest, Jordan engine, fan pump, head box or at any other suitable point ahead of the papermaking wire or screen, followed by forming the treated fibers into a felted product on the wire or cylinder.

The pH of the pulp suspension at the point of addition of the polymer is not critical and may be any value between about 4 and 9 so that the process tolerates the presence of alkaline reacting fillers such as calcium carbonate. Optimum strength is generally developed at a pH of between about 4.5 and 8.0 so that, if desired, the process may be performed wholly on the alkaline side. Although appreciable wet strength is noted when as little as 0.1% of the polymer is adsorbed in this manner, it is ordinarily advisable to apply quantities within the range of about 0.5% to 5% or more of the resin solids, based on the dry weight of the paper stock, i.e. folders.

After adding and incorporating the polymer into the furnish and forming the paper, the felted product is preferably heated for about 0.1 to 60 minutes as 75°-300° F. in the usual manner to evaporate water therefrom. This heating also increases or further develops the polymer bond between the cellulosic fibrils that results in wet strength in the finished product. Tests have shown that although appreciable wet strength is obtained in paper dried at room temperature, a higher degree of wet strength is obtained when the paper is dried by heating.

The polymers of our invention are water-soluble, and they may be produced from copolymers of an acrylamide with cationic monomers, or terpolymers of an acrylamide and other non-ionic or cationic monomers as discussed above.

The non-ionic comonomers may be selected from the list: methacrylamide, N-methylacrylamide, N,N-dimethylacrylamide, acrylonitrile, N-vinyl pyrrolidane, ethylacrylate, vinyl acetate, methyl (meth) acrylate and the like.

Other non-ionic comonomers which are known to these skilled in the art to be capable of free radical polymerization are also meant to be included as useful in this invention. The preferred water-soluble polymers, prior to chlorination, are those polymers with the cationically charged monomers listed above, i.e., MAPTAC (methacrylamidopropyl trimethyl ammonium chloride), DADM (diallyldimethyl ammonium chloride), DMAPMA (dimethylaminopropyl methacrylamide) DMAEM (dimethylamino ethyl methacrylate), DMAEA (dimethylamino ethyl acrylate) and their quaternary salts. As with the non-ionic monomers, other cationic monomers which are known to those skilled in the art and are capable of free-radical polymerization may also be used and are meant to be included in this invention.

The following examples are set forth for purposes of illustration only and are not to be construed as limitations on the present invention except as set forth in the appended claims. All parts and percentages are by weight unless otherwise specified.

The term "standard viscosity," as used herein, means the viscosity of a 0.1% solution of the polymer in 1M NaCl in centipoises measured on a Brookfield Viscometer with UL adapter, speed 6 rpm, 25° C.

EXAMPLE 1

To a suitable reaction vessel are charged 250 parts of a 10% aqueous polyacrylamide solution (approximate molecular weight: 267,000). This solution is diluted by adding 250 parts of water and then cooled to 0° C. Chlorine gas is charged into the solution with stirring for 20 minutes at the rate of 39.33 ml of chlorine gas per minute. (A total of 10 mole % of chlorine gas is charged). During the charge of the chlorine gas, the reaction vessel is immersed in an ice-water bath in order to keep the reaction temperature between 0° C. and 1° C. After the completion of the addition of the chlorine, the reaction solution is poured slowly with stirring into 3,000 parts of methanol. The precipitated product is collected. The polymer contains 10 mole % of N-chloroamide functional group and is soluble in water.

EXAMPLES 2–7

An 1% aqueous solution is prepared by dissolving 30 parts of a high molecular weight solid copolymer of poly(acrylamide-MAPTAC) (molar ratio of acrylamide to MAPTAC is 90:10) in 2970 parts of water. The solution is sheared in a Waring blender to give a polymer of standard viscosity of 1.95 cps. To prepare N-chlorinated polymers with different N-chloro contents, 500 parts of the above solution is used in each preparation. Thus, 500 parts of the solution is chlorinated by addition of chlorine gas at 25° C. with stirring. For each chlorination, the rate of the addition of chlorine gas is so adjusted that the chlorination is completed in 5 minutes. The temperature of the reaction solution is kept below 30° C.

The N-chloro content of each resin solution is analyzed by the active chlorine determination method. The mole % of N-chlorinated acrylamide unit for each resin is shown in Table I.

TABLE I

| Polymer of Examples | Mole % N-Chloroacrylamide Units |
|---|---|
| 2 | 3.1 |
| 3 | 6.3 |
| 4 | 11.5 |
| 5 | 15.4 |
| 6 | 30 |
| 7 | 8.3 |

EXAMPLES 8–12

A 1% aqueous solution is prepared by dissolving 95 parts of a high molecular weight emulsion containing 32.51% active solid of a copolymer of acrylamide and Q-DMAEM Methosulfate (the mole ratio of acrylamide to Q-DMAEM Methosulfate is 90:10) in a mixture of 1.7 parts of a commercially available emulsion breaker and 2991.75 parts of water. The solution is sheared in a Waring blender to give a polymer of standard viscosity of 1.8 cps. The process for Examples 2–7 is repeated. The polymers prepared and the mole % of N-chlorinated acrylamide unit for the resins are listed in Table II.

TABLE II

| Polymer of Examples | Mole % N-Chloroacrylamide Units |
|---|---|
| 8 | 3.5 |
| 9 | 6 |
| 10 | 11.5 |
| 11 | 17.4 |
| 12 | 31 |

EXAMPLE 13

A 20% solids copolymer of acrylamide-DADM of molecular weight of 180,000 is prepared by polymerization of 75 wt % of acrylamide and 25 wt % of DADM. 50 parts of the copolymer is diluted with 150 parts of water in the reaction flask. 150 Parts of n-heptane are added and the mixture is stirred and cooled externally to 0° C. 1598 c.c. of chlorine are charged into the reaction mixture in 15 minutes while the temperature of the reaction mixture is kept at 0° C. to 2° C. during the chlorination process by external cooling. The reaction mixture is then poured slowly into 2 liters of ethanol with agitation. The product polymer is precipitated. The precipitate is collected by filtration and dried. It is found by analysis that the product polymer contains 26.2 mole % of N-chloroamide units.

EXAMPLES 14–18

An emulsion copolymer of acrylamide and Q-DMAEM Methosulfate which contains 10 mole % of Q-DMAEM Methosulfate is prepared by a standard preparation method. The solid content of the emulsion is 38.3% (wt) and has a standard viscosity of 1.5 cps. 200 Parts of the emulsion copolymer are charged to a reaction vessel and the emulsion is stirred with external cooling to 10° C. The emulsion is then chlorinated by addition of chlorine gas. The temperature of the reaction mixture is kept at about 10° C. during the chlorination process. The resultant polymers are recovered after various chlorination times and the active chlorine content of each determined by the active chlorine determination method. The results are shown in Table III.

TABLE III

| Polymer of Examples | Active chlorine in the polymer wt. % |
|---|---|
| 14 | 0.7 |
| 15 | 1.6 |
| 16 | 2.4 |
| 17 | 4.1 |
| 18 | 6.7 |

EXAMPLES 19–23

The process of Examples 14–18 is repeated using 200 parts of an emulsion copolymer (38.3% solids) of an acrylamide-Q-DMAEM methosulfate copolymer which contains 15 mole % of Q-DMAEM methosulfate and has a standard viscosity of 1.5 cps. The active chlorine content of the resulting polymers is shown in Table IV.

TABLE IV

| Polymers of Examples | Active chlorine in the polymer wt. % |
|---|---|
| 19 | 0.7 |
| 20 | 2.1 |
| 21 | 3.0 |
| 22 | 5.6 |

TABLE IV-continued

| Polymers of Examples | Active chlorine in the polymer wt. % |
| --- | --- |
| 23 | 9.0 |

EXAMPLES 24–27

The process of Examples 14–18 is again repeated using 200 parts of an emulsion copolymer (65.9% overall solids) and 90.4% internal solids)* of the copolymer of Examples 19–23. The active chlorine content of the recovered polymers is shown in Table V.

TABLE V

| Polymer of Examples | Active chlorine in the polymer wt. % |
| --- | --- |
| 24 | 1.0 |
| 25 | 2.1 |
| 26 | 3.1 |
| 27 | 4.5 |

*90.4% polymers in the aqueous phase of the emulsion.

EXAMPLE 28

The polymer of Example 1 is dissolved in water to make up a 2% aqueous solution. The aqueous solution is used in a tub-sizing test. Tub-sizing tests are carried out, first, at the natural pH of the solution (pH-3.0), and secondly after adjusting the pH of the solution to 6.0. The same solution, after standing at 23° C. for 2 days, is also used in the tub-sizing test. After sheet is tub-sized in the solution and dried on a blotting paper, the % pick-up of the polymer solution is calculated. The sheet is dried on a drum drier for 1 minute at 240° F. The sheet is also given an additional cure of 5 minutes at 105° C. An alkali resistance test* is carried out on the treated sheet. The test results are listed in Table VI, below. Tensile strength in (lb/in) is normalized to a basis weight of 50 lb. per 25"×40"/500 ream. As can be seen, the paper conditioned with the novel wet-strength agents of the present invention exhibit excellent alkali resistance, permanence and cure response.

*Standard 30 second soak in 1% commercially available alkaline cleaner solution to test for wet alkali resistance.

to the pulp aliquot. The pulp aliquots are adjusted to the pH values shown in the following Table. The polymer solution added corresponds to 1.5% based on the dry weight of the fibers. The aliquots are gently stirred for 5 minutes or 10 minutes and then handsheets are made. The handsheet is dried on a drum drier for 1 minute at 240° F. and then postcured for 5 minutes at 220° F.

The Wet Tensile expressed in Table VII is normalized to a basis weight of 50 lb. per 25"×40"/500 ream.

TABLE VII

| Runs | Pulp pH | Polymer - Pulp Contact Time | Wet tensile, lb/in |
| --- | --- | --- | --- |
| 1 | 4 | Controls - No polymer added | 0.6 |
| 2 | 4 | 5 min. | 3.30 |
| 3 | 4 | 10 min. | 3.36 |
| 4 | 6 | 5 min. | 2.38 |
| 5 | 6 | 10 min. | 1.81 |
| 6 | 8 | 5 min. | 0.60 |
| 7 | 8 | 10 min. | 0.94 |

EXAMPLES 30–157

The following examples illustrate application of the polymers of the present invention by the beater addition method to develop paper having improved wet strength.

For the tests, aliquots are taken of laboratory master batches of well-beaten pulps. Bleached pulp (hardwood:softwood, 50:50) is used. The pulp aliquots are adjusted to the pH values shown in the table and to each is added at 0.5% to 1% based on the dry weight of the fibers to one of the N-chloroamide polymers, also as shown in the table. The polymers are added in the form of 0.5% aqueous solutions. The aliquots are gently stirred for 1 minute to permit the adsorption to go to equilibrium (equivalent to substantial completion). The suspensions are sheeted on a large handsheet machine at a basis weight of approximately 50 lb. per 25"×40"/500 ream and the sheets dried for one minute at 240° F. on a rotary drum drier. The sheets are then conditioned and dried and wet tensile strengths determined by the TAPPI methods.

TABLE VI

| | POLYMER SOLUTION pH | POLYMER PICK-UP %(I) | TENSILE STRENGTH (lb/in) | | | | | |
| --- | --- | --- | --- | --- | --- | --- | --- | --- |
| | | | Off-Machine Cure (1 min. @ 240° F.) | | | | Post Cure (5 Min, 105° C.) | |
| | | | Wet | | | | Wet | |
| RUN | | | Immediate | Permanent(I) | Alkaline | Dry | Immediate | Permanent |
| 1 | 7 | (control) | <1 | <1 | <1 | — | <1 | <1 |
| 2 | 3.05 | 1.85 | 3.34 | 3.63 | 3.29 | 20.55 | 3.75 | 4.05 |
| 3 | 6.0 | 1.73 | 5.89 | 6.01 | 5.57 | 30.54 | 6.73 | 5.75 |
| 4(III) | 4.2 | 1.78 | 5.44 | 4.63 | 4.71 | 27.12 | 5.73 | 5.03 |
| 5 | 3.4 | 1.78 | 4.32 | 3.96 | 4.14 | 21.99 | 4.30 | 3.70 |
| 6 | 6.0 | 1.77 | 4.16 | 3.96 | 3.79 | 18.25 | 3.99 | 3.94 |
| 7 | 7.0 | 1.72 | 4.94 | 3.89 | 4.29 | 21.83 | 5.12 | 4.64 |

(I)16 hours water soak
(II)Tub-sized on 2% aqueous solution. Solution tested immediately after pH adjustment
(III)The solution was used after standing at 23° C. for 2 days after it was prepared

EXAMPLE 29

A 1% aqueous solution of the polymer of Example 13 is prepared by dissolving 1 part of the solid polymer in 99 parts of water. 15 ml of the polymer solution is added The Wet Tensile expressed in Table VIII & IX is normalized to a basis weight of 50 lb. per 25"×40"/500 ream. In the Tables, AMD=acrylamide.

TABLE VIII

| Example | Polymer of Example No. | Name | (mole %) CONHCl | % added | Pulp pH | Wet Tensile (lb/in) |
|---|---|---|---|---|---|---|
| | — | Control | — | — | | 0.6 |
| 30 | 2 | 90% AMD-10% MAPTAC | 3.1 | 0.5 | 6 | 2.51 |
| 31 | 3 | " | 6.3 | 0.5 | " | 3.08 |
| 32 | 4 | " | 11.5 | 0.5 | " | 3.13 |
| 33 | 5 | " | 15.4 | 0.5 | " | 3.61 |
| 34 | 6 | " | 30 | 0.5 | " | 3.37 |
| 35 | 7 | " | 8.3 | 0.5 | " | 3.16 |
| 36 | 2 | " | 3.1 | 0.5 | " | 2.42 |
| 37 | 3 | " | 6.3 | 0.5 | " | 2.82 |
| 38 | 4 | " | 11.5 | 0.5 | " | 3.41 |
| 39 | 5 | " | 15.4 | 0.5 | " | 3.45 |
| 40 | 6 | " | 30 | 0.5 | " | 3.22 |
| 41 | 2 | " | 3.1 | 1.0 | " | 2.50 |
| 42 | 3 | " | 6.3 | " | " | 3.42 |
| 43 | 4 | " | 11.5 | " | " | 4.25 |
| 44 | 5 | " | 15.4 | " | " | 4.19 |
| 45 | 6 | " | 30 | " | " | 4.54 |
| 46 | 7 | " | 8.3 | " | " | 3.82 |
| 47 | 2 | " | 3.1 | " | " | 2.58 |
| 48 | 3 | " | 6.3 | " | " | 3.19 |
| 49 | 4 | " | 11.5 | " | " | 4.32 |
| 50 | 5 | " | 15.4 | " | " | 4.33 |
| 51 | 6 | " | 30 | " | " | 4.92 |
| 52 | 2 | " | 3.1 | 0.5 | 8 | 2.47 |
| 53 | 3 | " | 6.3 | " | " | 3.01 |
| 54 | 4 | " | 11.5 | " | " | 3.30 |
| 55 | 5 | " | 15.4 | " | " | 1.86 |
| 56 | 7 | " | 8.3 | " | " | 3.28 |
| 57 | 2 | " | 3.1 | " | " | 2.22 |
| 58 | 3 | " | 6.3 | " | " | 3.07 |
| 59 | 4 | " | 11.5 | " | " | 2.78 |
| 60 | 5 | " | 15.4 | " | " | 0.95 |
| 61 | 6 | " | 30 | " | " | 3.46 |
| 62 | 2 | " | 3.1 | 1.0 | " | 2.84 |
| 63 | 3 | " | 6.3 | " | " | 3.99 |
| 64 | 4 | " | 11.5 | " | " | 4.11 |
| 65 | 5 | " | 15.4 | " | " | 4.20 |
| 66 | 7 | " | 8.3 | " | " | 3.99 |
| 67 | 2 | " | 3.1 | " | " | 2.98 |
| 68 | 3 | " | 6.3 | " | " | 4.75 |
| 69 | 4 | " | 11.5 | " | " | 4.01 |
| 70 | 5 | " | 15.4 | " | " | 2.49 |
| | — | Control | — | | 6 | 0.6 |
| 71 | 8 | 90% AMD-10% G* | 3.5 | 0.5 | " | 2.28 |
| 72 | 9 | " | 6 | " | " | 2.81 |
| 73 | 10 | " | 11.5 | " | " | 3.49 |
| 74 | 11 | " | 17.4 | " | " | 3.14 |
| 75 | 12 | " | 31 | " | " | 2.77 |
| 76 | 8 | " | 3.5 | 1.0 | " | 2.62 |
| 77 | 9 | " | 6 | " | " | 4.07 |
| 78 | 10 | " | 11.5 | " | " | 4.45 |
| 79 | 11 | " | 17.4 | " | " | 4.09 |
| 80 | 12 | " | 31 | " | " | 3.59 |
| 81 | 8 | " | 3.5 | 0.5 | 8 | 2.98 |
| 82 | 9 | " | 6 | " | " | 2.85 |
| 83 | 10 | " | 11.5 | " | " | 2.00 |
| 84 | 11 | " | 17.4 | " | " | 1.89 |
| 85 | 12 | " | 31 | " | " | 1.39 |
| 86 | 8 | " | 3.5 | 1.0 | " | 3.89 |
| 87 | 9 | " | 6 | " | " | 4.15 |
| 88 | 10 | " | 11.5 | " | " | 3.54 |
| 89 | 11 | " | 17.4 | " | " | 2.23 |
| 90 | 12 | " | 31 | " | " | 1.45 |

*G = Q-DMAEM Methosulfate

TABLE IX

| Example | Polymer of Example No. | Name | Active Chlorine Wt. % | % added | Pulp pH | Wet Tensile (lb/in) |
|---|---|---|---|---|---|---|
| | — | Control | — | — | 6 | 0.6 |
| 91 | 14 | 90% AMD-10% G | 0.7 | 1.0 | " | 1.32 |
| 92 | 15 | " | 1.6 | " | " | 2.09 |
| 93 | 16 | " | 2.4 | " | " | 2.94 |
| 94 | 17 | " | 4.1 | " | " | 3.82 |
| 95 | 14 | " | 0.7 | " | " | 2.42 |
| 96 | 15 | " | 1.6 | " | " | 2.77 |
| 97 | 16 | " | 2.4 | " | " | 3.56 |
| 98 | 17 | " | 4.1 | " | " | 5.29 |
| 99 | 18 | " | 6.7 | " | " | 4.00 |
| 100 | 14 | " | 0.7 | " | " | 2.40 |
| 101 | 15 | " | 1.6 | " | " | 2.73 |

TABLE IX-continued

| Example | Polymer of Example No. | Polymer of Example Name | Active Chlorine Wt. % | % added | Pulp pH | Wet Tensile (lb/in) |
|---|---|---|---|---|---|---|
| 102 | 16 | " | 2.4 | " | " | 3.68 |
| 103 | 17 | " | 4.1 | " | " | 4.85 |
| 104 | 18 | " | 6.7 | " | " | 3.47 |
| — | — | Control | — | — | 8 | 2.01 |
| 105 | 14 | 90% AMD-10% G | 0.7 | 1.0 | " | 2.01 |
| 106 | 15 | " | 1.6 | " | " | 3.51 |
| 107 | 16 | " | 2.4 | " | " | 5.12 |
| 108 | 17 | " | 4.1 | " | " | 4.85 |
| 109 | 14 | " | 0.7 | " | " | 2.73 |
| 110 | 15 | " | 1.6 | " | " | 3.69 |
| 111 | 16 | " | 2.4 | " | " | 4.67 |
| 112 | 17 | " | 4.1 | " | " | 5.05 |
| 113 | 14 | " | 0.7 | " | " | 2.39 |
| 114 | 15 | " | 1.6 | " | " | 4.18 |
| 115 | 16 | " | 2.4 | " | " | 4.69 |
| 116 | 17 | " | 4.1 | " | " | 3.90 |
| 117 | 18 | " | 6.7 | " | " | 2.93 |
| — | — | Control | — | — | 6 | 0.53 |
| 118 | 19 | 85% AMD-15% G | 0.7 | 1.0 | " | 1.35 |
| 119 | 20 | " | 2.1 | " | " | 2.52 |
| 120 | 21 | " | 3.0 | " | " | 2.98 |
| 121 | 22 | " | 5.6 | " | " | 3.70 |
| 122 | 19 | " | 0.7 | " | " | 1.67 |
| 123 | 20 | " | 2.1 | " | " | 3.37 |
| 124 | 21 | " | 3.0 | " | " | 4.33 |
| 125 | 22 | " | 5.6 | " | " | 4.39 |
| 126 | 23 | " | 9.0 | " | " | 3.52 |
| 127 | 19 | " | 0.7 | " | 8 | 2.03 |
| 128 | 20 | " | 2.1 | " | " | 4.60 |
| 129 | 19 | " | 0.7 | " | " | 2.37 |
| 130 | 20 | " | 2.1 | " | " | 3.91 |
| 131 | 21 | " | 3.0 | " | " | 4.34 |
| 132 | 22 | " | 5.6 | " | " | 3.65 |
| 133 | 23 | " | 9.0 | " | " | 2.58 |
| — | — | Control | — | — | 6 | 0.63 |
| 134 | 24 | 85% AMD-15% G | 1.0 | 1.0 | " | 1.97 |
| 135 | 25 | " | 2.1 | " | " | 2.36 |
| 136 | 26 | " | 3.1 | " | " | 2.67 |
| 137 | 27 | " | 4.5 | " | " | 1.62 |
| 138 | 24 | " | 1.0 | " | " | 2.01 |
| 139 | 25 | " | 2.1 | " | " | 2.69 |
| 140 | 26 | " | 3.1 | " | " | 2.76 |
| 141 | 27 | " | 4.5 | " | " | 3.37 |
| 142 | 24 | " | 1.0 | " | " | 1.90 |
| 143 | 25 | " | 2.1 | " | " | 2.33 |
| 144 | 26 | " | 3.1 | " | " | 2.76 |
| 145 | 27 | " | 4.5 | " | " | 3.37 |
| 146 | 24 | " | 1.0 | " | 8 | 2.07 |
| 147 | 25 | " | 2.1 | " | " | 2.34 |
| 148 | 26 | " | 3.1 | " | " | 3.34 |
| 149 | 27 | " | 4.5 | " | " | 3.87 |
| 150 | 24 | " | 1.0 | " | " | 2.30 |
| 151 | 25 | " | 2.1 | " | " | 2.95 |
| 152 | 26 | " | 3.1 | " | " | 3.32 |
| 153 | 27 | " | 4.5 | " | " | 4.41 |
| 154 | 24 | " | 1.0 | " | " | 2.06 |
| 155 | 25 | " | 2.1 | " | " | 2.97 |
| 156 | 26 | " | 3.1 | " | " | 3.53 |
| 157 | 27 | " | 4.5 | " | " | 3.97 |

EXAMPLE 158

Utilizing Q-DMAEM Methyl chloride in place of G of Example 71 achieves substantially the same results.

EXAMPLE 159

When Q-DMAEA is used to replace G in Example 91, similar results are achieved.

EXAMPLE 160

Example 2 is repeated except that MAPTAC is replaced by DADM. Again, excellent chlorination of the copolymer results.

EXAMPLES 161-167

Example 1 is again followed except that the charge polymer is varied. The different change polymers and the amounts of resultant N-chlorinated amino groups are set forth in Table X, below.

TABLE X

| Example | AMD | NNAMD | ACN | MA | MAMD | Z | % N—Cl groups in final Polymer |
|---|---|---|---|---|---|---|---|
| 161 | 20 | 80 | — | — | — | — | 15 |
| 162 | 20 | — | — | — | 80 | — | 15 |
| 163 | — | 80 | — | — | — | 20 | 10 |
| 164 | — | 65 | 20 | — | — | 15 | 15 |
| 165 | 80 | 20 | — | — | — | — | 10 |
| 166 | 80 | 10 | — | — | — | 10 | 10 |
| 167 | 70 | 20 | — | 10 | — | — | 10 |

AMD = Acrylamide
NNAMD = N,N-dimethylacrylamide
ACN = Acrylonitrile
MA = Methyl acrylate
MAMD = Methacrylamide
Z = Q-DMAEM Methosulfate

We claim:

1. A water-soluble polymer comprising recurring units of the formula:

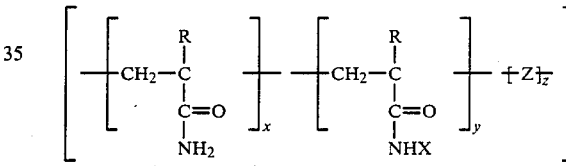

wherein R is hydrogen or methyl, X is a halogen atom, the ratio of x to y ranges from about 99.9:0.1 to about 50:50, respectively, the ratio of (x plus y) to z ranges from about 99.9 to 0.1 to about 50:50, respectively, and Z is the residue of a copolymerized cationic monomer, the molecular weight of the polymer being at least about 100,000.

2. A polymer according to claim 1 wherein R is hydrogen.

3. A polymer according to claim 1 wherein R is hydrogen and X is chlorine.

4. A polymer according to claim 1 wherein Z is diallyl dimethyl ammonium chloride polymerization residue.

5. A polymer according to claim 1 wherein Z is methacrylamidopropyl trimethyl ammonium chloride polymerization residue.

6. A polymer according to claim 1 wherein Z is dimethylamino ethyl methacrylate methosulfate polymerization residue.

7. A polymer according to claim 1 wherein up to about 20%, by weight, of component x is replaced by nonionic monomer.

8. A polymer according to claim 1 wherein Z is dimethylamino ethyl methacrylate methyl chloride polymerization residue.

* * * * *